United States Patent
Schultz et al.

(10) Patent No.: US 11,598,970 B2
(45) Date of Patent: *Mar. 7, 2023

(54) IMAGING LIGHT GUIDE WITH REFLECTIVE TURNING ARRAY

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 1161 days.

This patent is subject to a terminal disclaimer.

(21) Appl. No.: 16/068,024

(22) PCT Filed: Jan. 5, 2017

(86) PCT No.: PCT/US2017/012319
§ 371 (c)(1),
(2) Date: Jul. 3, 2018

(87) PCT Pub. No.: WO2017/120326
PCT Pub. Date: Jul. 13, 2017

(65) Prior Publication Data
US 2021/0215941 A1     Jul. 15, 2021

Related U.S. Application Data

(60) Provisional application No. 62/275,552, filed on Jan. 6, 2016.

(51) Int. Cl.
*G02B 27/09*     (2006.01)
*G02B 27/01*     (2006.01)
(Continued)

(52) U.S. Cl.
CPC .......... *G02B 27/0944* (2013.01); *G02B 6/34* (2013.01); *G02B 27/0081* (2013.01);
(Continued)

(58) Field of Classification Search
CPC .......... G02B 27/0944; G02B 27/0081; G02B 27/4205; G02B 27/4272; G02B 27/0172; G02B 6/34; G02B 2027/0123
See application file for complete search history.

(56) References Cited

U.S. PATENT DOCUMENTS

| 6,891,865 B1 | 5/2005 | Ma |
| 7,724,442 B2 | 5/2010 | Amitai |

(Continued)

FOREIGN PATENT DOCUMENTS

| JP | 5344169 B2 | 11/2013 |
| JP | 2015145973 A | 8/2015 |

(Continued)

OTHER PUBLICATIONS

International Search Report for International Application No. PCT/US2017/012319 dated May 4, 2017.

(Continued)

*Primary Examiner* — Xuemei Zheng
(74) *Attorney, Agent, or Firm* — Harter Secrest & Emery LLP; Jacob D. Merrill

(57) ABSTRACT

An imaging light guide has a waveguide and an in-coupling diffractive optic formed on the waveguide and disposed to direct image-bearing light beams into the waveguide. An array of two or more at least partially reflective surfaces are oriented in parallel and disposed to expand the image-bearing light beams from the in-coupling diffractive optic in a first dimension and to direct the expanded image-bearing light beams toward an out-coupling diffractive optic. The out-coupling diffractive optic is formed on the waveguide (Continued)

and disposed to expand the image-bearing light beams in a second dimension orthogonal to the first dimension and to direct the image-bearing light beams toward a viewer eyebox.

22 Claims, 16 Drawing Sheets

(51) Int. Cl.
    *G02B 6/34*     (2006.01)
    *G02B 27/42*     (2006.01)
    *G02B 27/00*     (2006.01)

(52) U.S. Cl.
    CPC ..... *G02B 27/0172* (2013.01); *G02B 27/4205* (2013.01); *G02B 27/4272* (2013.01); *G02B 2027/0123* (2013.01); *G02B 2027/0178* (2013.01)

(56) References Cited

U.S. PATENT DOCUMENTS

| | | | |
|---|---|---|---|
| 2003/0165017 A1* | 9/2003 | Amitai | G02B 6/0018 359/636 |
| 2005/0180687 A1 | 8/2005 | Amitai | |
| 2006/0126181 A1 | 6/2006 | Levola | |
| 2006/0126182 A1 | 6/2006 | Levola | |
| 2007/0159673 A1* | 7/2007 | Freeman | G02B 6/0028 359/19 |
| 2007/0171329 A1 | 7/2007 | Freeman | |
| 2007/0188837 A1* | 8/2007 | Shimizu | G02B 27/0172 359/13 |
| 2009/0303599 A1 | 12/2009 | Levola | |
| 2010/0214659 A1* | 8/2010 | Levola | G02B 6/0035 359/566 |
| 2013/0051730 A1 | 2/2013 | Travers et al. | |
| 2013/0250431 A1 | 9/2013 | Robbins et al. | |

FOREIGN PATENT DOCUMENTS

| | | |
|---|---|---|
| WO | 2009077802 A1 | 6/2009 |
| WO | 2009101238 A1 | 8/2009 |
| WO | 2014/188149 A1 | 11/2014 |

OTHER PUBLICATIONS

International Written Opinion for International Application No. PCT/US2017/012319 dated May 4, 2017.
Pekka Ayras et al., "Near-to-eye display based on retinal scanning and a diffractive exit-pupil expander", Optics, Photonics, and Digital Technologies for Multimedia Applications, 2010, 77230V-1-72230V-8, Proc. of SPIE vol. 7723, Bellingham, WA.

* cited by examiner

IMAGING LIGHT GUIDE WITH REFLECTIVE TURNING ARRAY

TECHNICAL FIELD

This invention generally relates to electronic displays and more particularly relates to head-mounted (near-eye) displays that use imaging light guides to convey image-bearing light to a viewer.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Light guides incorporating various types of waveguides, relay image-bearing light to a viewer in a narrow space, acting as exit-pupil expanders for redirecting the virtual image to the viewer's pupil and enabling this superposition function.

In the conventional light guide, collimated angularly related light beams from an image source are coupled into the light guide substrate, generally referred to as a waveguide, by an input optical coupling such as an in-coupling diffraction grating, which can be formed on a surface of the substrate or buried within the substrate. Other types of diffractive optics could be used as input couplings, including diffractive structures formed of alternating materials of variable index such as holographic polymer dispersed liquid crystal (HPDLC) or volume holograms. The diffractive optics could also be formed as surface relief diffraction gratings. The collimated light beams can be directed out of the waveguide by a similar output optical coupling, which can also take the form of a diffractive optic. The collimated angularly related beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The output coupling can also be arranged for enlarging the exit pupil. For example, the collimated beams can be enlarged in one dimension by offsetting partially reflected portions of the collimated beams in a direction at which the collimated beams propagate along the output coupling or by ejecting collimated beams of different angles from different positions along the waveguide to more efficiently overlap the collimated beams at the eye relief distance from the waveguide.

A so-called "turning optic" located along the waveguide between the input coupling and the output coupling, can be used for expanding pupil size in a second dimension. The expansion can be effected by offsetting reflected portions of the collimated beam to enlarge a second dimension of the beams themselves or by directing the collimated beams to different areas of the output coupling so the collimated beams of different angles are ejected from different positions to more efficiently overlap within the eyebox. The turning optic can also take the form of a diffraction optic and, especially when located between the diffraction gratings of the input coupling and output coupling, can also be referred to as an intermediate grating.

Although conventional imaging light guide arrangements have provided significant reductions in bulk, weight, and overall cost of near-eye display optics, overall efficiency of the gratings is often limited by optical losses occurring at each grating interface. Since each grating area can only be fully optimized for one specific field angle and for one specific wavelength, performance across the field of view of the virtual image or across the visual spectrum of the same virtual image can vary greatly. This is true also of the turning grating that directs light that is traveling from the in-coupling to the out-coupling diffractive optics. Because an appreciable amount of input light energy is lost as the light encounters each diffractive optic, the input image source must be bright enough to compensate for lost brightness in the virtual image presented to the viewer.

Thus, it can be appreciated that there is a need for improved designs of image bearing light guides that still provide the desired pupil expansion, but provide enhanced efficiently in head-mounted displays.

In considering a light guide design used for imaging it should be noted that image-bearing light traveling within a waveguide is effectively encoded by the input coupling, whether the coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating, placed in an intermediate position between the in-coupling and out-coupling diffractive optics, is typically chosen so that it does not induce any change on the encoded light. Preferably, the turning gratings redirect ray bundles within the waveguide, but do not change the encoded angular information of the virtual image. The resulting virtual image in such a designed system is not rotated. Further, if such a system did introduce rotation to the virtual image, it would do so non-uniformly across different field angles and wavelengths of light, thus causing unwanted distortions or aberrations in the resulting virtual image.

U.S. Pat. No. 6,829,095 by Amitai entitled "Substrate-Guided Optical Beam Expander" discloses input and output couplings in the form of mirrors that reflect sets of image bearing light beams into and out of a planar waveguide. The output coupling is divided into an array of reflective surfaces for expanding the exit pupil along one dimension. An intermediate array of reflective surfaces, referred to herein as a turning mirror, provides for expanding the exit pupil in an orthogonal dimension. The various input, output, and intermediate reflective surfaces are matched to each other to preserve the desired angular orientations of the image bearing beams.

One-dimensional (1-D) pupil-expansion guides of the type Amitai describes, however, have proved to be costly and difficult to fabricate. Extending this concept to 2-D beam expansion, using an array of mirrors oriented at a second set of angles, greatly complicates fabrication tasks that are already formidable and introduces alignment requirements that would be extremely difficult to satisfy.

Thus, both the turning gratings and the turning mirrors have been matched and oriented to work with similar types of input and output couplings, i.e., gratings with gratings and mirrors with mirrors. However, if a turning grating were used to redirect light that has been input using a mirror or a prism, this would produce unwanted effects in the resultant virtual image. As one consideration, with any type of reflective surface used in imaging, there can be unwanted reversal/rotation of the in-coupled light.

From the perspective of manufacturability, the use of diffractive optics to input and output the image-bearing light beams into and out of the waveguide can simplify a number of optical design problems. There is still, however, a need for an optical solution that allows better performance, increased efficiency, and compact packaging arrangements for redirecting light within a planar waveguide from the input couplings to the output couplings.

SUMMARY OF INVENTION

It is an object of the present disclosure to advance the art of image presentation within compact head-mounted (near-eye) displays. Advantageously, embodiments of the present disclosure provide a wearable display with an imaging light guide that offers an enlarged pupil size for presenting high resolution wide field of view (FOV) content to the viewer.

Imaging apparatus in embodiments of the present disclosure uses (a) diffraction to direct light into and out from a planar waveguide while providing pupil expansion along one dimension of a virtual image and (b) reflection within the waveguide for light redirection and pupil expansion along a second dimension of the virtual image.

This novel arrangement offers advantages in increased optical efficiency and brightness and allows more compact HMD and related display design options, since the arrangement provides both image rotation and reversal when compared against fully diffractive solutions.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide that includes a waveguide, an in-coupling diffractive optic, an array of two or more at least partially reflective surfaces oriented in parallel to each other, and an out-coupling diffractive optic. The in-coupling diffractive optic directs a plurality of light beams, each representing a pixel of a virtual image, into the waveguide. The array of two or more at least partially reflective surfaces expands the image-bearing light beams from the in-coupling diffractive optic in a first dimension and directs the expanded image-bearing light beams toward the out-coupling diffractive optic. The out-coupling diffractive optic expands the image-bearing light beams in a second dimension and directs the image-bearing light beams from the waveguide toward a viewer eyebox.

BRIEF DESCRIPTION OF THE DRAWING FIGURES

DETAILED DESCRIPTION OF THE INVENTION

Figure 1:
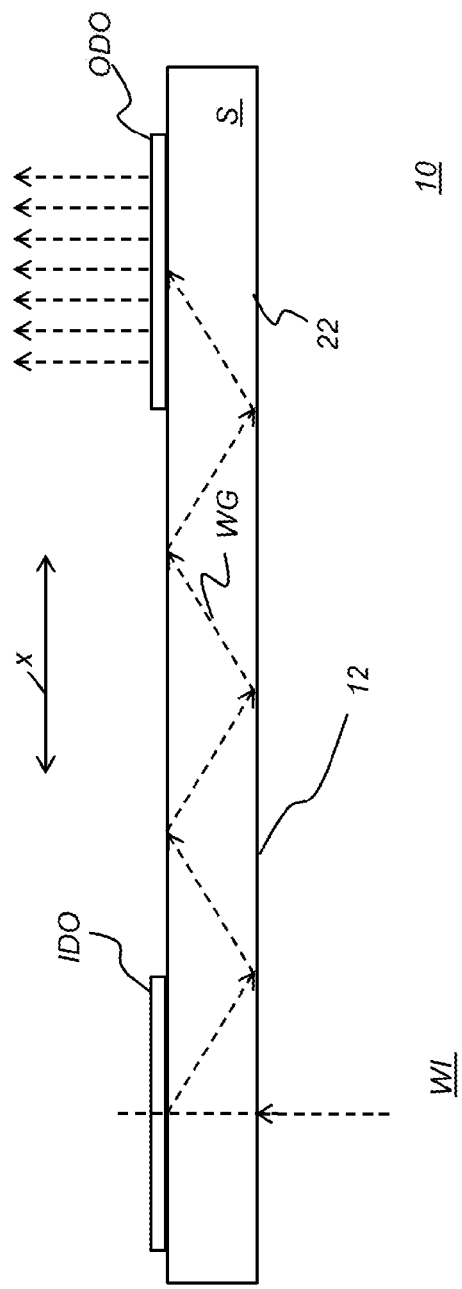
FIG. 1 is a schematic diagram showing a simplified cross-sectional view of one possible configuration of a monocular type imaging light guide arranged as a diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, "reflectivity" is expressed as a percentage based on a ratio of the intensity of light reflected from the surface to the light incident upon the surface over the considered spectrum.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

Unlike previous waveguide implementations that use diffraction for directing light internal to the imaging light guide that provides the virtual image display to the viewer, imaging light guide embodiments of the present disclosure use reflection rather than diffraction for redirecting diffracted light within the waveguide and for expanding the pupil in one direction. This arrangement can result in improved efficiency and brightness and relaxed constraints on the orientation of the image source for the imaging light guide.

FIG. 1 is a diagram showing a simplified cross-sectional view of one possible configuration of a conventional monocular type imaging light guide 10 arranged as diffractive beam expander or exit pupil expander formed with a waveguide 22 incorporating an input coupling, such as an in-coupling diffractive optic IDO, and an output coupling, such as an out-coupling diffractive optic ODO, arranged on a transparent and planar waveguide substrate S. In this example, the in-coupling diffractive optic IDO is shown as a reflective type diffractive optic arranged on an upper surface of the waveguide substrate S. However, in-coupling diffractive optic IDO could alternately be a transmissive diffractive optic, arranged on a lower surface 12 of the waveguide substrate S, where the in-coming light beam WI first interacts with the waveguide substrate S. The diffractive optic can be formed on, in, attached, adjacent or otherwise optically coupled to the waveguide 22 and can be formed as a diffraction grating, a volume hologram or other holographic patterned element, or other type of optical component with a ruling or other periodic array that diffracts the incoming, image-bearing light into or out of the waveguide 22. The volume holograms can be formed of alternating materials of variable index such as holographic polymer dispersed liquid crystal (HPDLC).

When used as a part of a virtual display system, in-coupling diffractive optic 110 couples each of a plurality of angularly related in-coming image-bearing light beams WI from an imager, via suitable front end optics (not shown), into the substrate S the waveguide 22. The input light beams WI are diffracted by in-coupling diffractive optic 110. For example, first order diffracted light propagates as an angularly related set of beams WG along the substrate S, moving toward the right in the FIG. 1 system, toward out-coupling diffractive optic 120. Between gratings or other types of diffractive optics, light is channeled or directed along the waveguide 22 by Total Internal Reflection (TIR). Out-coupling diffractive optic 120 contributes to beam expansion via multiple diffractive encounters with the propagating light beams WG along its length, i.e., along the x-axis in the view of FIG. 1, and directs the diffracted light from each encounter outwards towards the intended location of an observer's eye.

Figure 2:
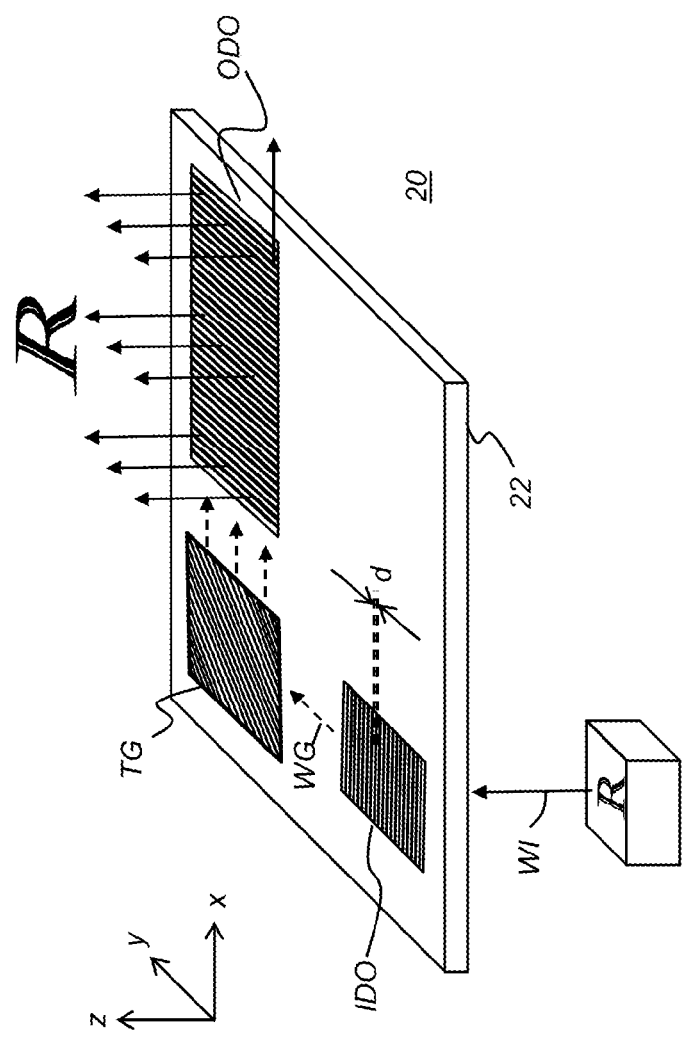
FIG. 2 is a perspective view showing an imaging light guide arranged as a diffractive beam expander with a turning grating.

The perspective view of FIG. 2 shows an imaging light guide 20 arranged as a known beam expander that provides beam expansion along x- and y-axes using an intermediate turning grating TG to redirect the light output (first diffracted mode) from in-coupling diffractive optic 110 to out-coupling diffractive optic 120. In the FIG. 2 device, in-coupling diffractive optic 110 containing periodic rulings with a period d diffracts angularly related incoming input optical beams WI into the waveguide 22 as a set of angularly related beams WG, propagating by total internal reflection in an initial direction towards the intermediate turning grating TG. Intermediate grating TG is termed a "turning grating" because of its function in the optical path, redirecting the beams WG from within the waveguide 22 according to its grating vector in a direction towards the out-coupling diffractive optic 120, thereby accounting for a difference in angle between the grating vectors of the in-coupling diffraction optic 110 and the out-coupling diffraction optic 120. Intermediate grating TG, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 2. The out-coupling diffractive optic 120 contributes to an orthogonal beam expansion via multiple diffractive encounters with the light beams WG along the redirected direction of propagation, i.e., along the x-axis in the view of FIG. 2.

The grating vectors, generally designated k and shown with subscripts where they are specific to light within a color channel, extend parallel to the plane of the waveguide surface and are in the direction of the periodicity of the in-coupling and out-coupling diffractive optics 110 and 120, respectively.

In considering a light guide design used for imaging it should be noted that image-bearing light traveling within a waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating TG, placed at an intermediate position between the input and output couplings, such as the in-coupling and out-coupling diffractive optics 110 and 120, is typically chosen to minimize any changes on the encoded light. As such, the pitch of the turning grating preferably matches the pitch of the in-coupling and out-coupling diffractive optics 110 and 120. In addition, the virtual image can be preserved by orienting the turning grating at around 60 degrees to in-coupling and out-coupling diffractive optics 110 and 120 in such a way that the encoded ray bundles are turned 120 degrees by one of the 1st reflection orders of the turning grating TG. The diffractive effects of the turning grating TG are most pronounced on the vector component of the incoming rays that are parallel to the grating vector of the turning grating. Turning gratings so arranged redirect ray bundles within the guide substrate while minimizing any changes to the encoded angular information of the virtual image. The resultant virtual image in such a designed system is not rotated. If such a system did introduce any rotation to the virtual image, the rotational effects could be non-uniformly distributed across different field angles and wavelengths of light, thus causing unwanted distortions or chromatic aberrations in the resultant virtual image.

The use of turning grating TG as envisioned for certain embodiments described herein preserves an inherent geometrical accuracy to the design of the light guide 20 so that the input beam and output beam are symmetrically oriented with respect to each other. With proper grating TG spacing and orientation, grating vectors k direct the light from the in-coupling diffractive optic 110 to the out-coupling diffractive optic 120. It should be noted that the image that is formed for the imaging light guide viewer is a virtual image, focused at infinity or at least well in front of the light guide 20, but with the relative orientation of output image content to input image content preserved. A change in the rotation about the z axis or angular orientation of incoming light beams WI with respect to the x-y plane can cause a corresponding symmetric change in rotation or angular orientation of outgoing light from out-coupling diffractive optic (ODO) 120. From the aspect of image orientation, turning grating TG is intended to function as a type of optical relay, providing expansion along one axis of the image that is input through the in-coupling diffractive optic (IDO) 110 and redirected to out-coupling diffractive optic (ODO) 120. Turning grating TG is typically a slanted or square grating or, alternately, can be a blazed grating. Reflective surfaces can alternately be used for turning the light toward the out-coupling diffractive optic 120.

Beam expansion in two different dimensions is provided when using the arrangement of FIG. 2. Turning grating TG expands the diffracted beam from in-coupling diffractive optic 110 in the y direction as shown. Out-coupling diffractive optic 120 further expands the diffracted beam in the x direction, orthogonal to the y direction as shown.

The known imaging light guide 20 that is shown in FIG. 2 has been used in a number of existing head-mounted device (HMD) designs for providing image content to a viewer. This type of beam expander is particularly well-suited to augmented reality applications in which image content can be superimposed on a real-world view as seen through the transparent imaging light guide.

Angular performance of the turning gratings can be limiting. The turning gratings, when designed correctly, can at best be an ideal solution for a single field angle and at a single wavelength. The efficiency curve for the reflective refractive order that actually redirects the light has similar characteristics to those for the in-coupling and out-coupling diffractive optics. A ray of the design wavelength and at a central field angle propagating through the system is efficiently in-coupled (diffractive optic IDO), efficiently turned and expanded in one dimension (grating TG), and efficiently out-coupled and expanded in the orthogonal dimension (diffractive optic ODO). A similar ray of the same wavelength, but from an extreme field point, would conversely be less efficiently coupled in, less efficiently turned, and less efficiently coupled out. This leads to difficulty in balancing performance, color balance, and brightness across the full angular field.

Conventional hand-held projection devices, such as pico-projectors for example, typically provide image content with a 9:16 height-to-width aspect ratio. Angular range limitations of the conventional imaging light guide design, in turn, constrain the allowed orientation of projector devices, typically preventing compact packaging of pico-projector devices in an HMD, for example. As a further constraint, overall light efficiency is limited, as was noted previously.

Embodiments of the present disclosure provide an optical system for forming a virtual image with an enlarged view pupil or eyebox. The optical system includes an imaging light guide in the form of a single planar waveguide component that has (i) an in-coupling element, such as an in-coupling diffractive optic IDO, for accepting incident image-bearing light beams and directing at least the first order diffracted light from the incident light beams along the planar component using TIR; (ii) an out-coupling element, such as an out-coupling diffractive optic ODO, for expanding the respective image-bearing light beams in a first direction transverse to the direction of beam propagation and directing the image-bearing light beams outward to form the virtual image; and (iii) a reflector array having at least first and second parallel reflective surfaces, differing from each other in reflectivity, that expand the respective image-bearing light beams in a second direction transverse to the direction of beam propagation and orthogonal to the first direction and are disposed at an angle that directs the diffracted light from the in-coupling diffractive optic toward the out-coupling diffractive optic for forming the virtual image. Where diffractive optics are used, the in-coupling and out-coupling diffractive optics IDO and ODO, respectively, preferably have the same diffraction period.

Figure 3:
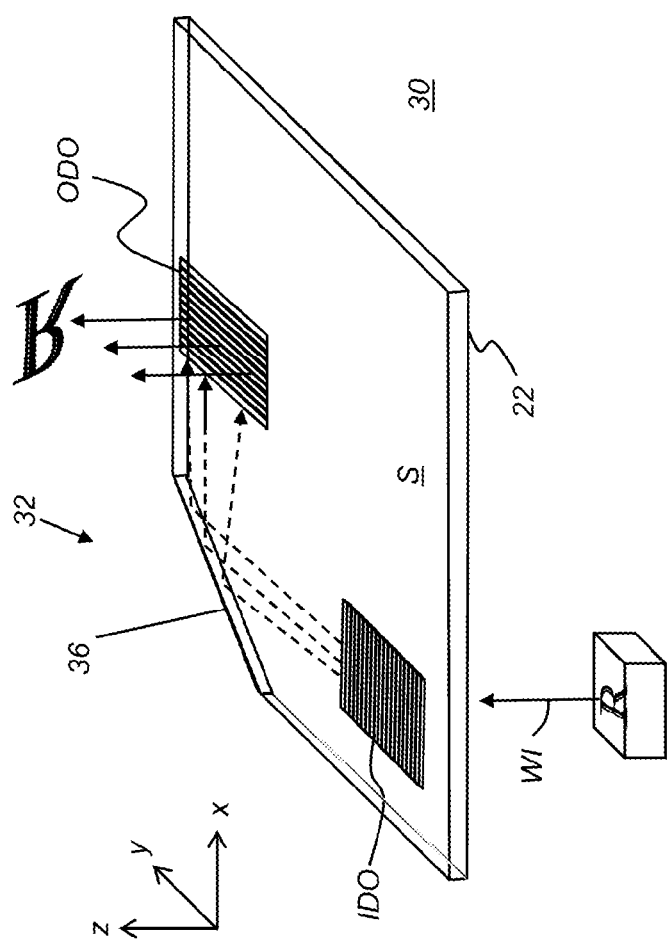
FIG. 3 is a perspective view showing an imaging light guide arranged as a hybrid beam expander for expansion in a single direction, using in-coupling and out-coupling diffractive optics and a reflector for turning the beams, according to an embodiment of the present disclosure.

To help boost the overall efficiency of an imaging light guide arranged as a beam expander, embodiments of the present disclosure use one or more reflective surfaces encased within, appended to, or otherwise formed as a part of the waveguide substrate to perform the turning and beam expanding function with respect to the y axis. As a first exemplary embodiment, FIG. 3 shows a light guide 30 arranged as a beam expander on a waveguide substrate S that uses a reflector 36 for turning the output beams. Reflector 36 is formed within or along an outer edge of the waveguide substrate S, disposed at an appropriate angle for the grating vectors in the direction of the periodicity of the in-coupling and out-coupling diffractive optics IDO and ODO, respectively. According to an embodiment of the present disclosure, reflector 36 reflects light that is parallel to the grating vector of in-coupling diffractive optic IDO so that the reflected light is, in turn, parallel to the grating vector of out-coupling diffractive optic ODO. Dashed lines show light paths for the diffracted first order light within the imaging light guide. As the dashed lines indicate, reflector 36 changes the orientation of the virtual image, effectively reversing the virtual image content and rotating the image at twice the incident angle of the central field chief ray at the reflector, as shown by the letter 'R' in this figure. As noted, pupil expansion is effected in one direction only in the FIG. 3 arrangement using the out-coupling diffractive optic ODO.

Figure 4:
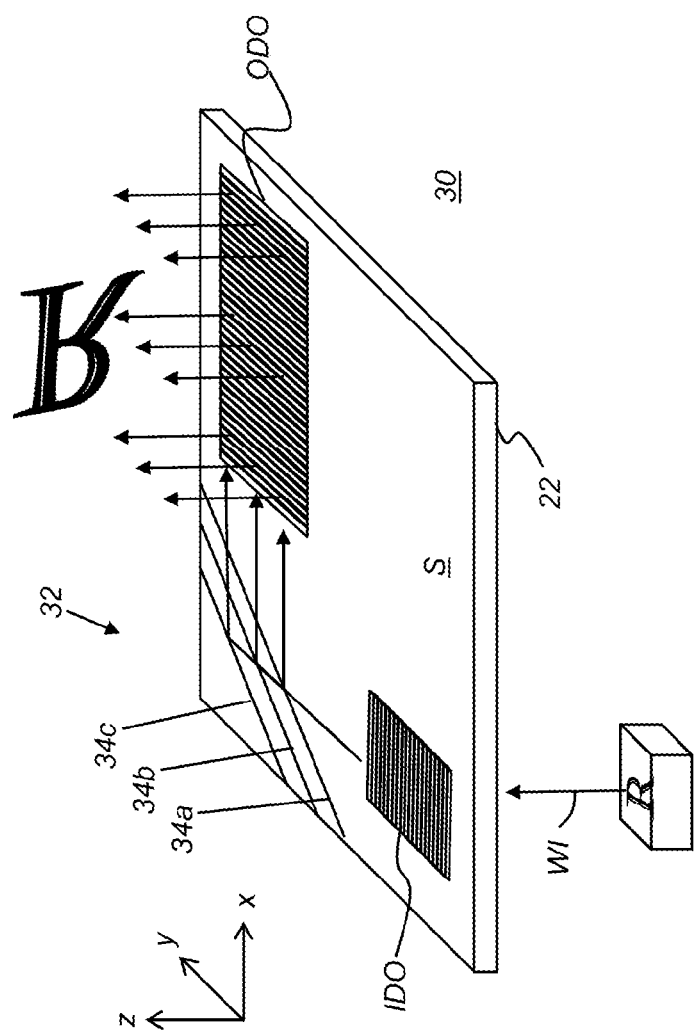
FIG. 4 is a perspective view showing an imaging light guide arranged as a hybrid 2-D beam expander that uses in-coupling and out-coupling diffractive optics and an array of reflectors for turning the beams, according to an embodiment of the present disclosure.

FIG. 4 is a perspective view that shows an imaging light guide 30 arranged as beam expander according to an embodiment of the present disclosure. Light guide 30 has in-coupling and out-coupling diffractive optics IDO and ODO respectively, as described with reference to FIGS. 2 and 3 and uses a reflector array 32 for 2-dimensional (2-D) beam expansion. An arrangement of this type expands the light beam output in the x and y directions. Reflector array 32 has three specularly reflective surfaces, shown in the FIG. 4 embodiment as reflectors 34a, 34b, and 34c. Some of the specularly reflective surfaces in the array are partially reflective, so that some of the light incident on reflector 34a is transmitted through to reflector 34b; similarly, some of the light incident on reflector 34b is transmitted through to reflector 34c. Reflectivity increases for successive reflectors in the array as the reflectors are further separated from the in-coupling or out-coupling diffractive optics IDO, ODO. The last or rearmost reflector in the series, reflector 34c in the example of FIG. 4, generally has a nominal reflectance of 100%.

In order to provide a uniform distribution of the light in the expanded pupil, the successive reflectors 34a, 34b, and 34c of reflector array 32 can have different amounts of reflectivity or, conversely, different amounts of transmittance. Exemplary values for a 5-reflector embodiment, with no absorption, are given in the following table.

TABLE

Exemplary Reflectivity for 5-Reflector Array

| Reflector | Reflectivity | Transmissivity |
|---|---|---|
| 1 | 12% | 88% |
| 2 | 16% | 84% |
| 3 | 23% | 77% |
| 4 | 38% | 62% |
| 5 | 100% | — |

Figure 5A:
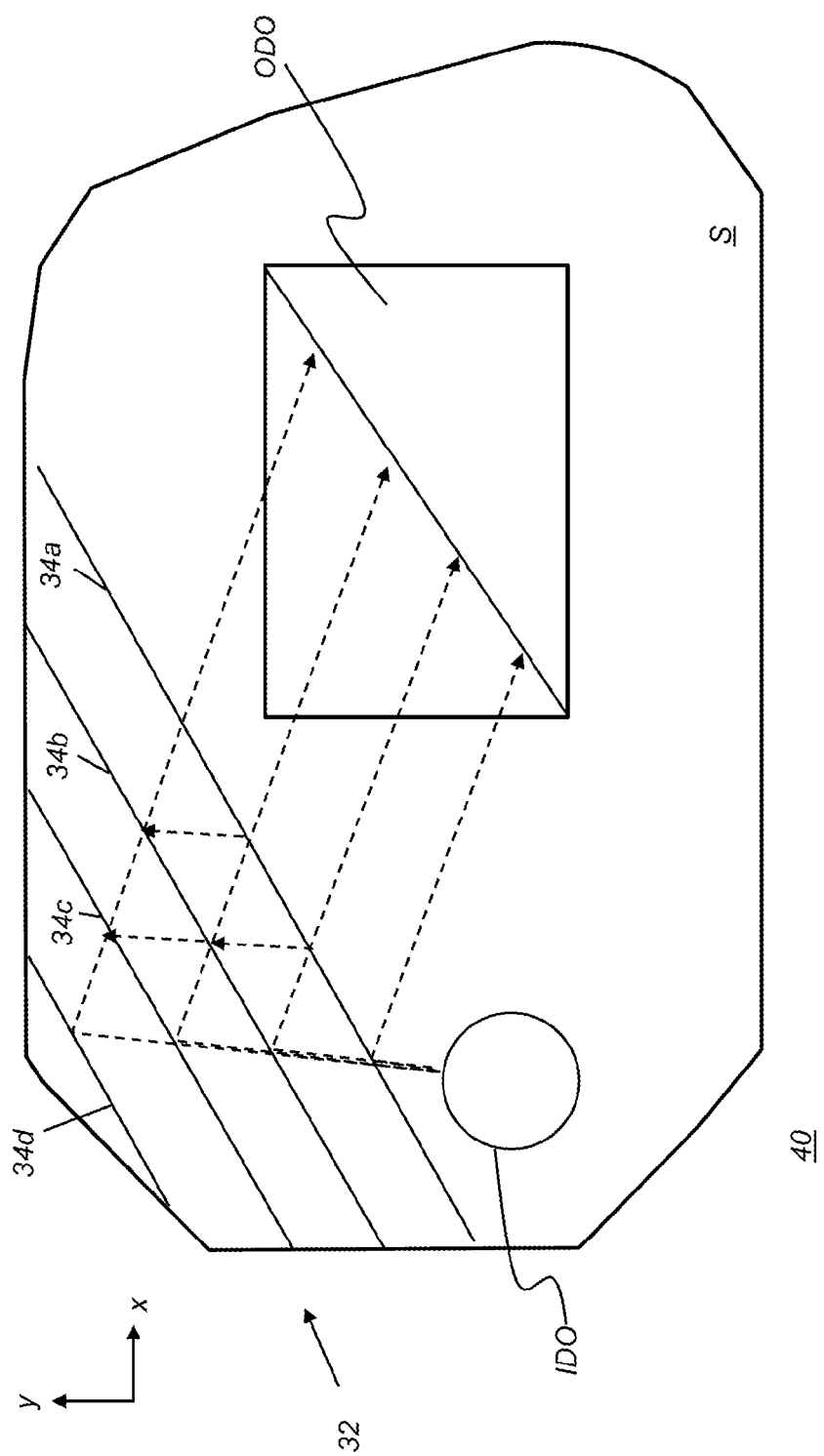
FIG. 5A is a plan view showing an imaging light guide that provides a beam expander using a reflector array.

FIG. 5A is a plan view of an imaging light guide 40 arranged as a beam expander that traces the axial light paths for central field points from in-coupling diffractive optic IDO to out-coupling diffractive optic ODO when using reflector array 32. In the example of FIG. 5A, reflector array 32 has four reflective surfaces, shown as reflectors 34a, 34b, 34c, and 34d.

With respect to the embodiment of FIG. 5A, beam expansion takes place not only due to the reflections of light transmitted to the reflectors 34a, 34b, 34c, and 34d, but also because portions of the reflected light are further reflected by the reflectors 34a, 34b, 34c, and 34d. Thus, the same light can encounter the same individual reflectors 34a, 34b, 34c, and 34d multiple times under conditions of transmission or reflection. Some of this multiple reflection is shown. As is suggested in FIG. 5A, reflectors 34a, 34b, and 34c are reflective on both sides, so that diminishing portions of the light propagate between each combination of parallel reflective surfaces. The reflectivity designated for each of the respective surfaces accounts for these additional reflections. It can also be noted that there will be some inevitable losses due to absorption as well as due to light propagation beyond the reflectors themselves or the target output grating area.

Figure 5B:
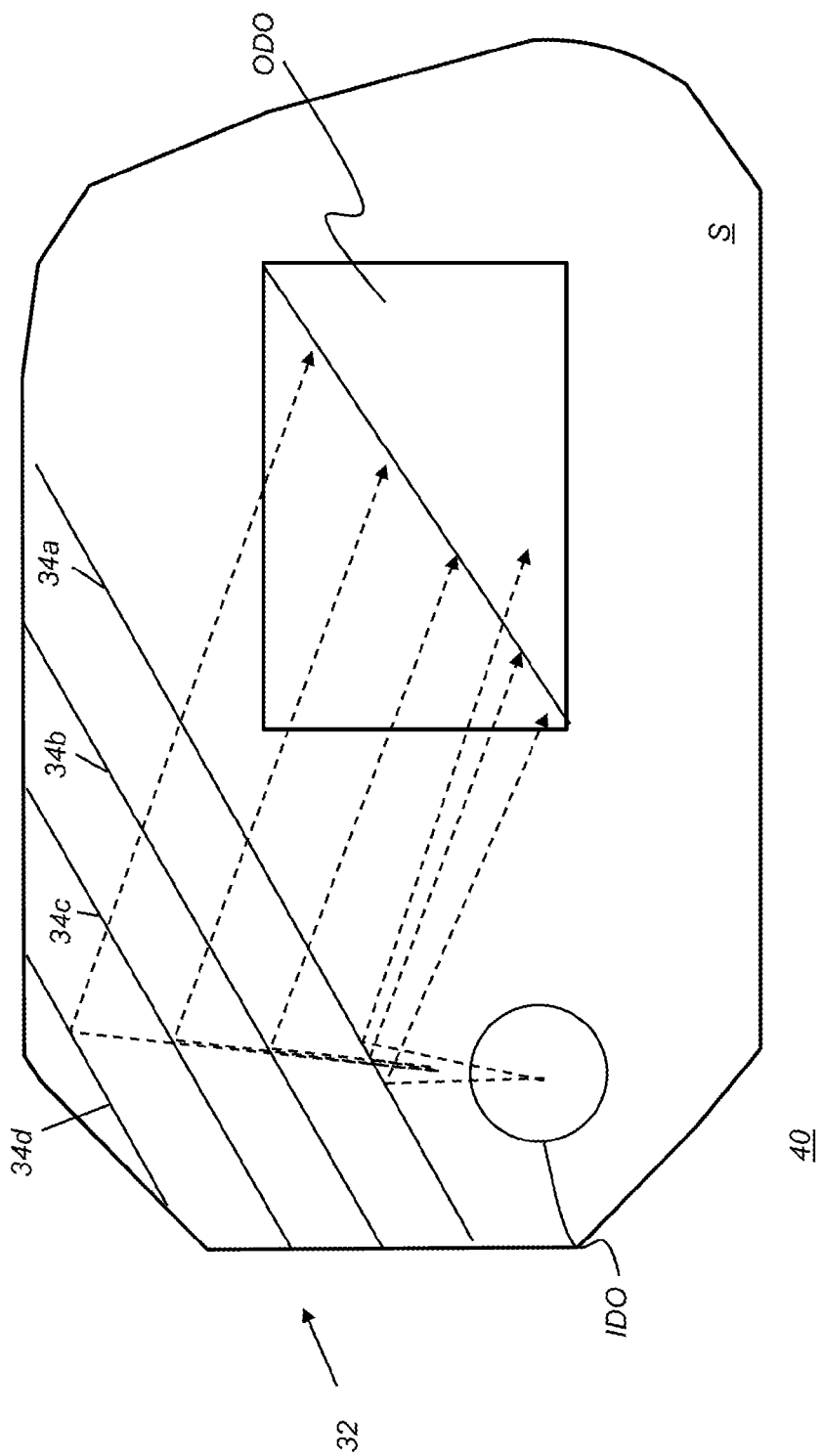
FIG. 5B is a plan view showing an imaging light guide that provides a beam expander using a reflector array and also showing an expanded portion of the field points of the incident image.

The spacing between the reflective surfaces of reflectors 34a, 34b, 34c, and 34d is another consideration for maintaining the desired intensity profile throughout each of the expanded beams. For example, one would not want to split an individual (pixel) beam into beamlets that are deflected beyond a region of proximate overlap with adjacent beamlets to avoid gaps or brightness variations in the image viewable within the eyebox. Proper reflectivity and spacing between reflective surfaces can also produce a desired distribution of energy across the expanded individual (pixel) beam composed of the multiple beamlets. In general, the distance between reflector surfaces should not exceed about 2.5 times the thickness of the guide substrate S FIG. 5B is a plan view of an imaging light guide 40 arranged as a beam expander that is modified to show redirection of field points spaced away from the central field point, with light at normal incidence. The same angular incidence of the light applies for each of reflectors 34a, 34b, 34c, and 34d.

Figure 6A:
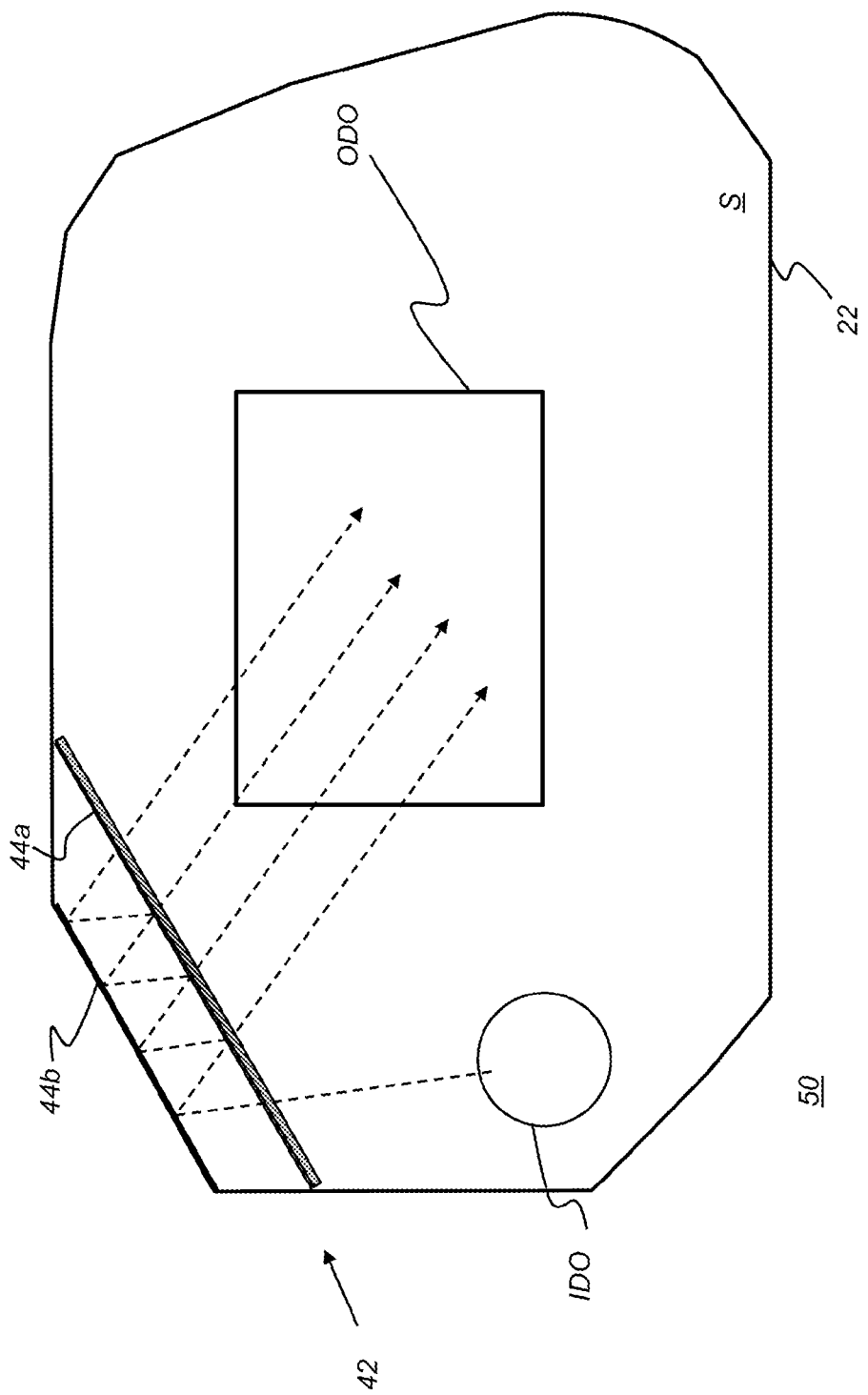
FIG. 6A is a plan view showing an imaging light guide that employs a gradient reflector array.

FIG. 6A shows an alternate embodiment of an imaging light guide 50 arranged as a beam expander using imaging light guide 22 that provides variable amounts of reflectance using only two reflectors 44a and 44b in a box arrangement provided by a gradient reflector array 42. Reflector 44b is a standard mirror with a nominal reflectance for visible light of 100%. Reflector 44a has a gradient coating with varying reflectance along its length, distributing reflected light internal to reflector array 42 in order to provide beam expansion. The phrase "gradient reflectivity" indicates that the reflectivity value changes progressively, preferably in a continuously increasing or decreasing manner, but can also include more incremental changes in reflectivity as may be preferable for purposes of manufacture or optical performance. According to an embodiment of the present disclosure, the gradient reflectivity over a length portion of the reflector 44a continuously changes monotonically over a range from less than 10% reflectivity to greater than 50% reflectivity. Other ranges can also be provided.

Figure 6B:
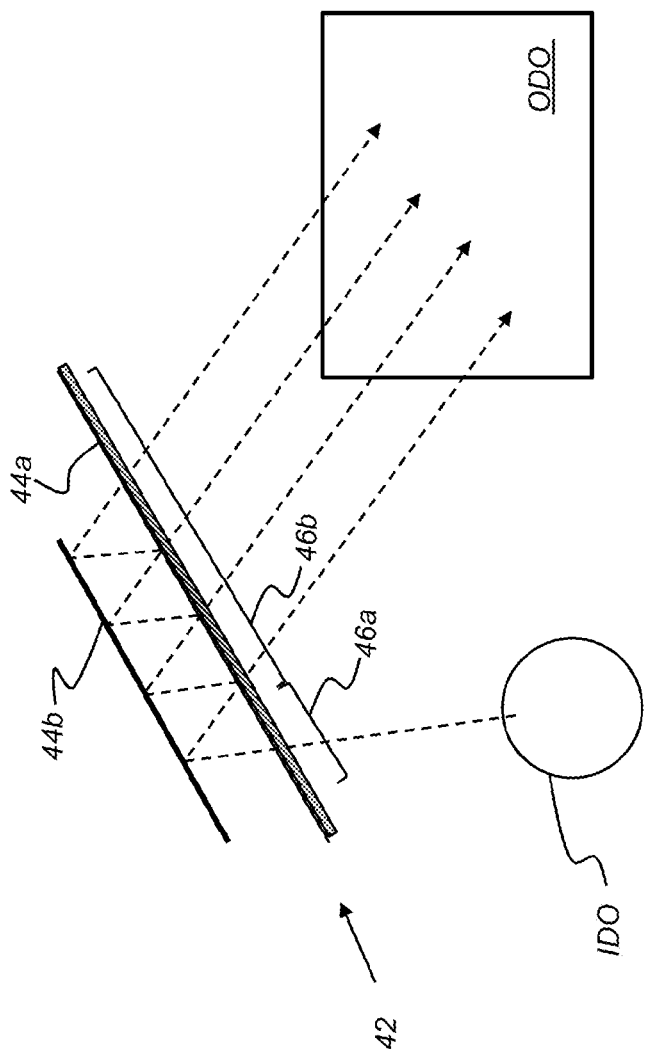
FIG. 6B is a schematic view showing how a gradient reflector array operates.

FIG. 6B is a schematic view, selectively omitting some of the imaging light guide 22 detail of FIG. 6A for clarity, showing how gradient reflector array 42 operates, repeatedly reflecting the light from in-coupling diffractive optic IDO with variably transmissive regions arranged in succession. Diffracted light output from in-coupling diffractive optic IDO initially passes through a fully transmissive region 46a of reflector 44a and is reflected by reflector 44b, which directs the light back toward reflector 44a. A partially transmissive region 46b of reflector 44a is coated to provide a reflective gradient, by way of example, ranging from 75% reflective to less than 50% reflective along the length of reflector 44a. The light that is transmitted through reflector 44a is directed outward toward out-coupling diffractive optic ODO. Reflector 44b reflects the incident light that had been reflected from region 46b back toward partially transmissive region 46b, over a segment of reflector 44a that is less reflective, such as 66% reflective in this example. Over the portion of reflector 44a that is 66% reflective, about ⅓ of incident light is then transmitted to another portion of out-coupling diffractive optic ODO. A diminishing amount of light is repeatedly reflected back and forth between reflectors 44a and 44b until a final remnant of the image-bearing light from in-coupling diffractive optic IDO is transmitted to diffractive optic ODO through gradient reflector 44a.

Figure 6C:
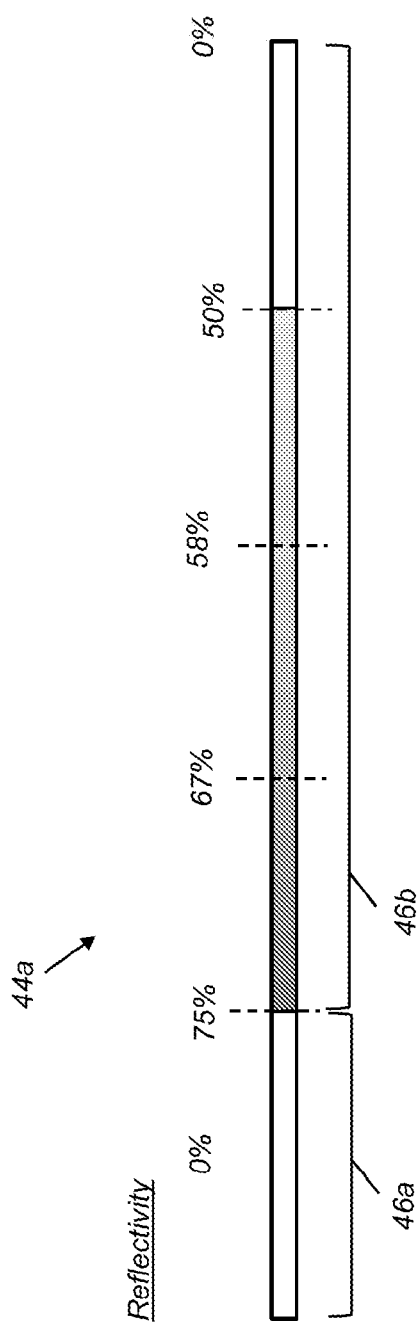
FIG. 6C is a plan view showing exemplary regions of a gradient reflector.
Figure 6D:
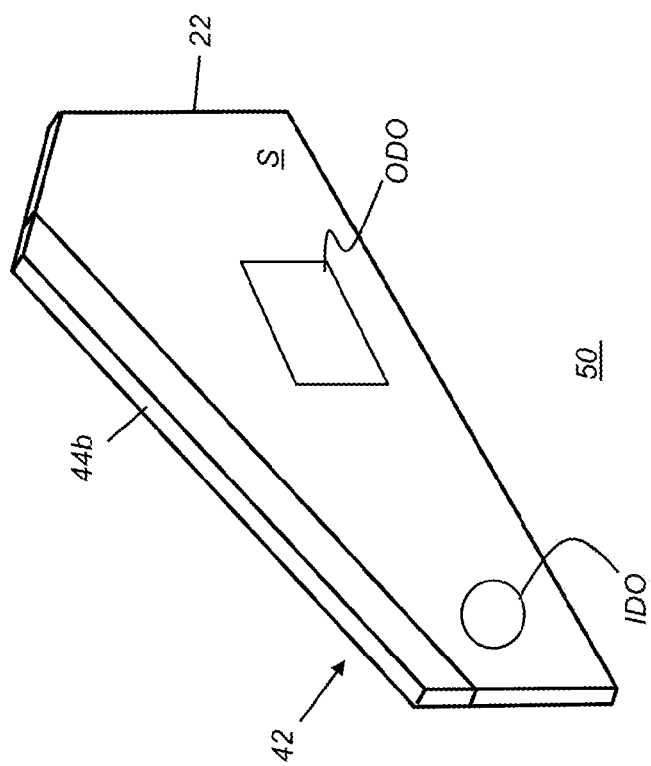
FIG. 6D is a perspective view showing an imaging light guide arranged as a beam expander having a gradient reflector array.

One possible overall arrangement of regions 46a and 46b of gradient reflector 44a is shown in side view in FIG. 6C. Dashed lines indicate local values of reflectivity along gradient reflector 44a. FIG. 6D shows an imaging light guide 60 arranged as a beam expander in a perspective view. Reflector 44b is formed along an edge of imaging light guide 22 in the example shown. It can be readily appreciated that reflectivity values given herein for the FIG. 6A-6D examples illustrate the general principle for varying the reflectivity of gradient reflector 44a but are not to be considered restrictive. The reflectivity values that are actually used in any embodiment can depend on various factors including amount of light loss, coatings tolerances, and other performance variables. Subregions having uniform reflectivity values, changing along the length of reflector 44a, could alternatively be provided.

The gradient reflectivity of reflector array 42 can provide an additional freedom sensitive to inclination angle. While simply expanding the individual (pixel) beams helps to expand the eyebox, the typical eyebox remains much smaller than the size of the individual expanded beams because the expanded beams do not fully intersect at the eyebox. In order to more fully intersect at the eyebox, the individual beams, which propagate in different directions, must exit from different positions within the output grating. To improve the chances of intersection (i.e., overlap) in one dimension, certain angle beams can be directed more toward one side of the output grating than the other. To cause this, the gradient reflective surface can be made selectively more reflective to light of certain angles of incidence over other angles of incidence so that the different angles are directed toward different sides of the output grating. Using this method is complicated by the individual (pixel) beams being angularly encoded in two dimensions. Thus, the reflective sensitivity should be limited to just one of the dimensions.

For best performance, the beam expander optics would provide each individual (pixel) beam with its own transverse distribution of energy so that most of the energy reaches the eyebox and non-overlapping portions of the beams contain less energy. The reflective surfaces of arrays 32 and 42 construct the output individual (pixel) beams as individual collections of relatively offset beam lets, where each beam let can vary in both intensity and position. Embodiments of the present disclosure allow the reflective intermediate beam expander to direct light toward out-coupling diffractive optic ODO through a range of angles spanning at least 90 degrees. The light can approach out-coupling diffractive optic ODO along either orthogonal axis of the image or somewhere in-between, such as at an oblique angle as shown in FIG. 5A. The capability for direction at an oblique angle can be advantageous for component positioning and packaging. In addition, the reflector arrays 32, 42 can provide for interconnecting the central field rays between the in-coupling and out-coupling diffractive optics IDO, ODO at oblique angles while maintaining alignment with one of the orthogonal axes x, y of the image, particularly at the out-coupling diffractive optic.

Figure 7:
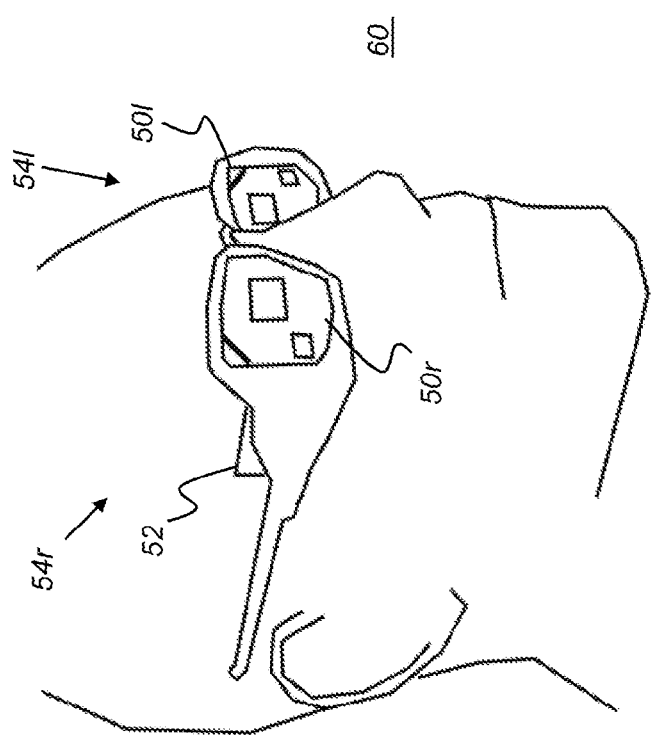
FIG. 7 is a perspective view showing a display system for augmented reality viewing using imaging light guides of the present disclosure.

The perspective view of FIG. 7 shows a display system 60 for three-dimensional (3-D) augmented reality viewing using imaging light guides of the present disclosure. Display system 60 is shown as an HMD with a left-eye optical system 54l having an imaging waveguide 50l arranged as a beam expander for the left eye and a corresponding right-eye optical system 54r having an imaging light guide 50r arranged as a beam expander for the right eye. An image source 52, such as a pico-projector or similar device, can be provided, energizable to generate a separate image for each eye, formed as a virtual image with the needed image orientation for upright image display, as described previously. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

Figure 8:
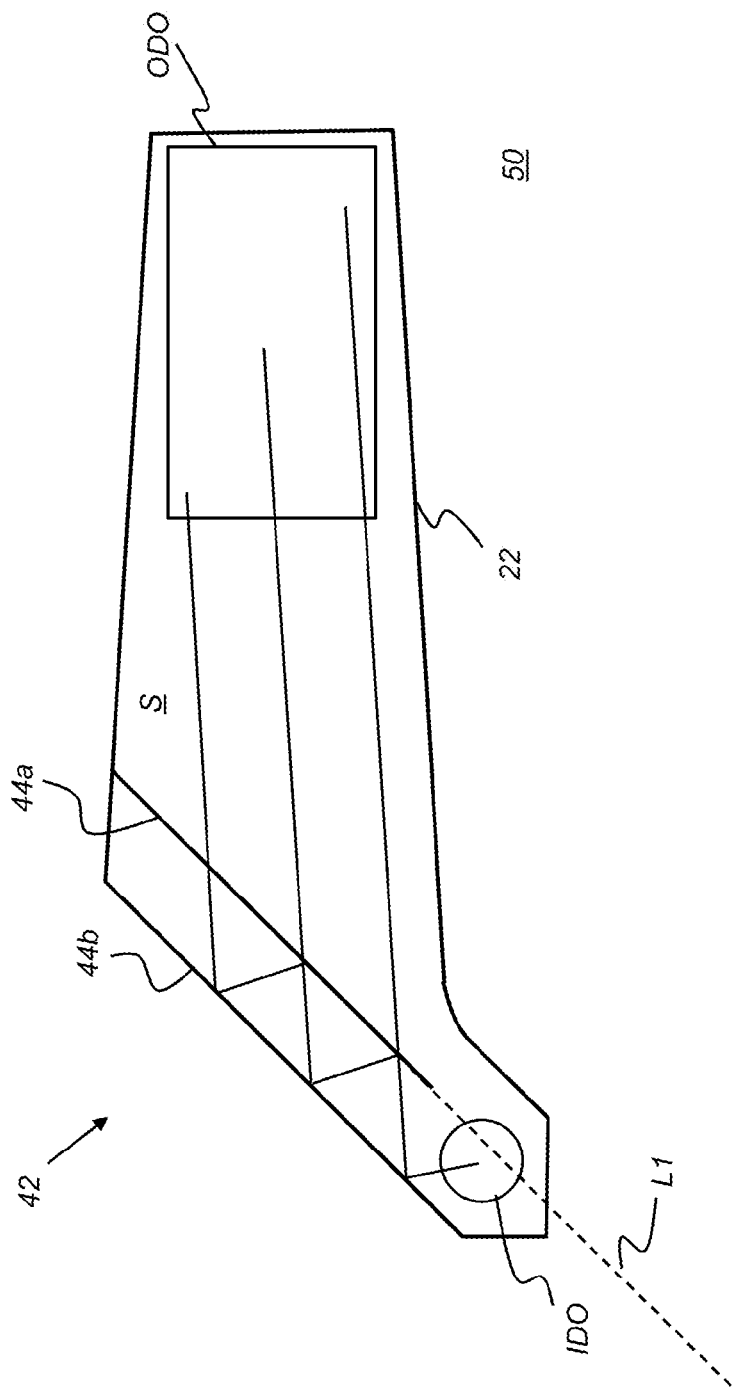
FIG. 8 is a schematic view showing an alternate embodiment of the present disclosure using a gradient reflector array.

The plan view of FIG. 8 shows an alternative embodiment of imaging light guide 22 using gradient reflector array 42. With this arrangement, in-coupling diffractive optic IDO is positioned more closely toward 100% reflective reflector 44b than in other embodiments and is in line with gradient reflective reflector 44a; a line L1 coincident with gradient reflective reflector 44a intersects in-coupling diffractive optic IDO. Reflectors 44a and 44b are at 45 degrees to the k vector or grating vector, which extends in the direction of periodicity, for in-coupling diffractive optic IDO.

Embodiments described herein use diffractive optics for in-coupling and out-coupling functions, and used for conventional waveguides. It must be noted that input and output coupling can use mechanisms other than diffraction, such as reflection, for example, for directing angularly encoded beams into and out from the imaging waveguide and providing the desired beam expansion.

Beam Expander Fabrication

Reflectors that form the reflector array 32 or gradient reflector array 42 can be formed using dichroic coatings, metalized coatings, or a combination of dichroic and metalized coatings. In pupil expander devices, methods for forming reflector array 32 can include coating individual pieces of glass or other transparent substrate, then piecing together these portions to form the beam expander in sections.

The imaging light guides are preferably manufactured in lots. The parallel surfaces (perpendicular to the outer surfaces of the imaging light guide) can be cut and polished first. The blocks can be the thickness of multiple imaging light guides, which can then be coated and assembled, ideally, using index-matched adhesive. This assembly process can be performed under an autocollimator or with a retro-reflected spot to maintain proper alignment. Angular alignment precision can be on the order of ¼ of the angular spread of one virtual image pixel. Achieving even finer resolution could require more accurate manufacturing practices.

The block of aligned surfaces can be diced in a direction perpendicular to these surfaces to define the outer surfaces of the imaging light guides. Each block of glass can then be polished as a high quality flat under a double planetary polisher to form a blank. The polished blank preferably has better than one arc minute of parallelism.

The final outer shape of the imaging light guide can be cut from a blank in an appropriate manner.

After proper surface preparation of the glass imaging light guide blank, the diffractive optics can be formed on one or both outer surfaces of the imaging light guide using nanoimprinting methods, for example.

The same methods described herein apply to embodiments that use multiple partially reflective surface systems as shown by example in FIG. 4 and gradient reflector systems and shown in FIG. 6A, with differences in the specified coatings and in the number of surfaces that require alignment.

The imaging light guide can be formed with a flat substrate such as an optical glass, as described with reference to an embodiment of the present disclosure. For example, embodiments of the present disclosure provide an imaging light guide formed in a flat waveguide and having an in-coupling diffractive optic formed on the substrate that is disposed to form first-order diffracted light from each incident light beam representing a pixel of the virtual image and an array of two or more reflective surfaces disposed in parallel along or within the substrate and wherein at least one of the two or more reflective surfaces lies in the path of first-order diffracted light formed from the in-coupling diffractive optic. The two or more reflective surfaces are disposed at an angle that directs the first-order diffracted light formed from the in-coupling diffractive optic towards an out-coupling diffractive optic that is disposed to direct light outward from the imaging light guide. The out-coupling diffractive optic and the in-coupling diffractive optic preferably have the same grating period and each of the two or more reflective surfaces has a different reflectivity.

Figure 9:
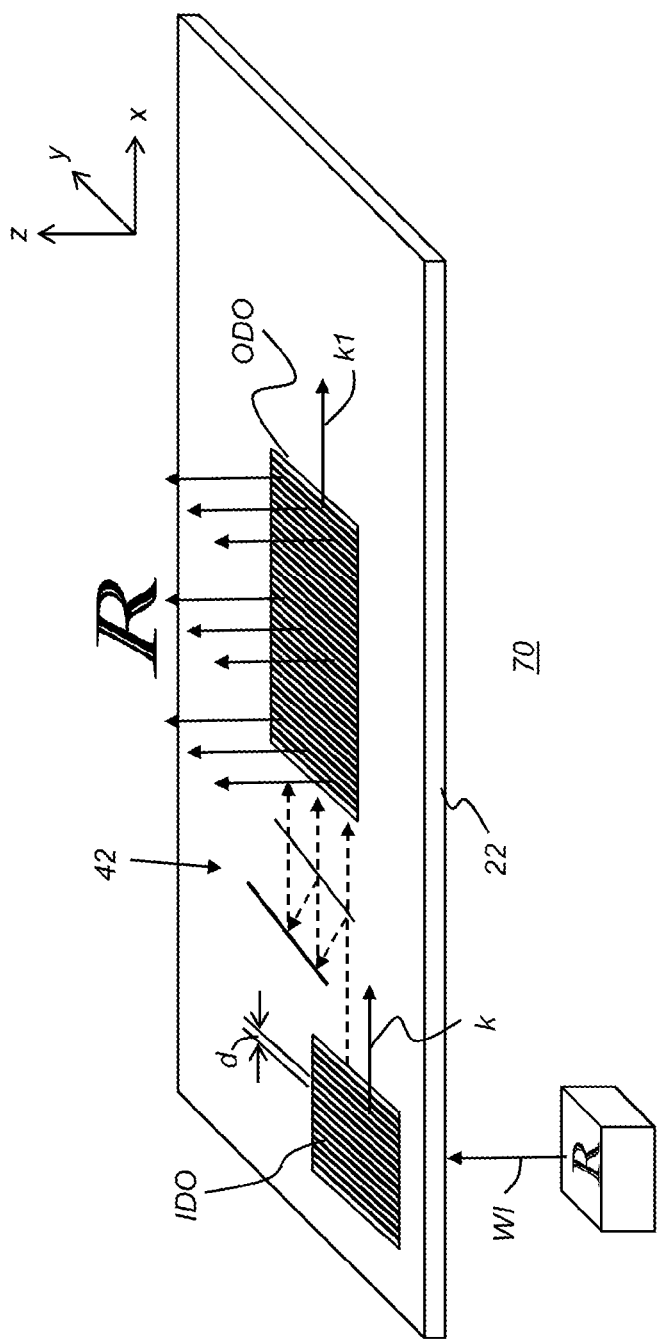
FIG. 9 is a schematic perspective view showing an imaging light guide having a gradient reflector array according to an embodiment of the present disclosure.
Figure 10A:
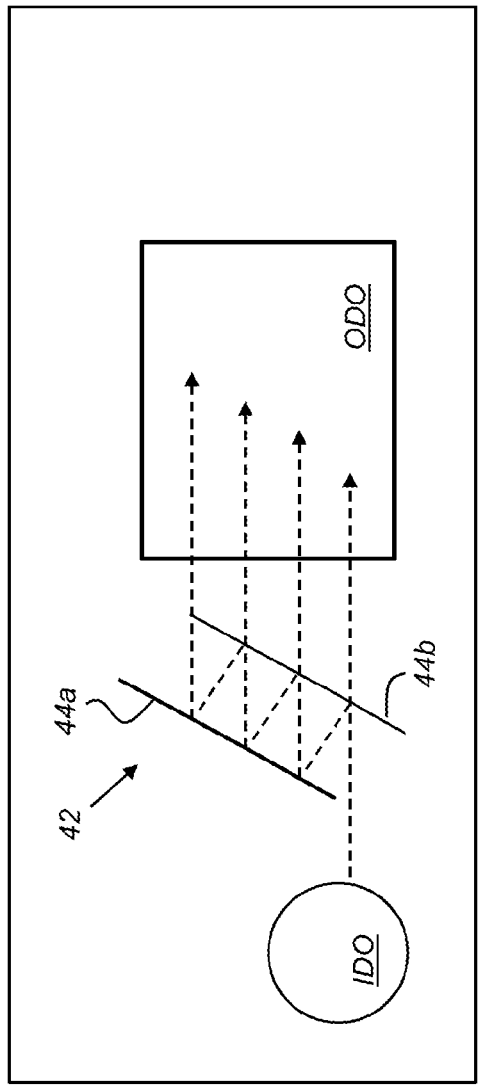
FIG. 10A is a schematic plan view of the imaging light guide according to FIG. 9.

It can be advantageous to fabricate a light guide in the form of a beam expander that provides an output image that has the same orientation as the input image that is provided in incoming light beam WI. In addition, there can be advantages to a beam expander having a reduced height. The perspective view of FIG. 9 and plan view schematic of FIG. 10A show a light guide 70 arranged as a beam expander that uses gradient mirror array 42 in order to provide these advantages. Image-bearing light beams from in-coupling diffraction optic IDO are directed to gradient mirror array 42 generally along the direction of its grating vector k. Gradient mirror array 42 expands the light beams in the y direction in the coordinate system that is shown and directs the expanded light beams to out-coupling diffraction optic ODO. Out-coupling diffraction optic ODO has the same grating direction (i.e., is in parallel) as in-coupling diffraction optic IDO. Thus grating vectors k and k1 for the in-coupling and out-coupling diffraction optics, respectively, are likewise in parallel.

Figure 10B:
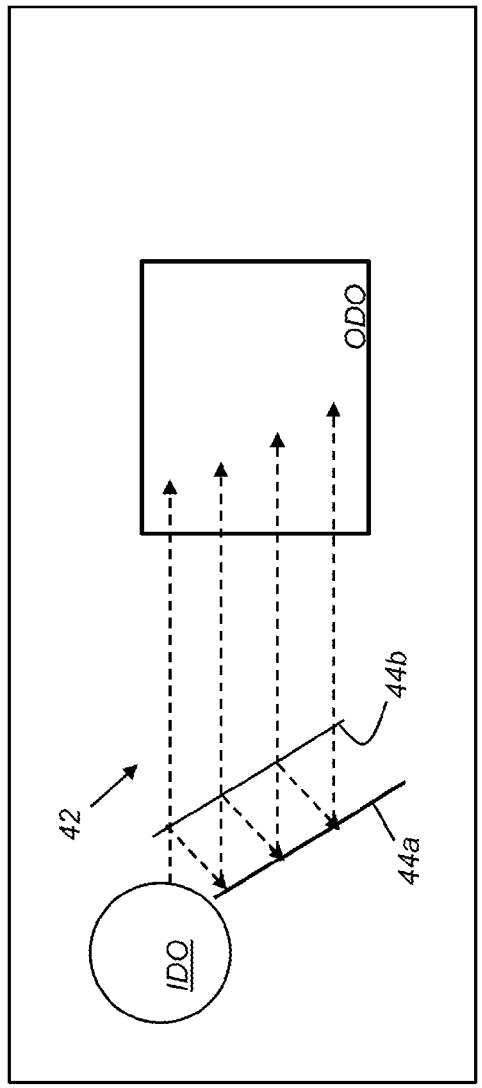
FIG. 10B is a schematic plan view showing an imaging light guide having a gradient reflector array according to an embodiment of the present disclosure.
Figure 10C:
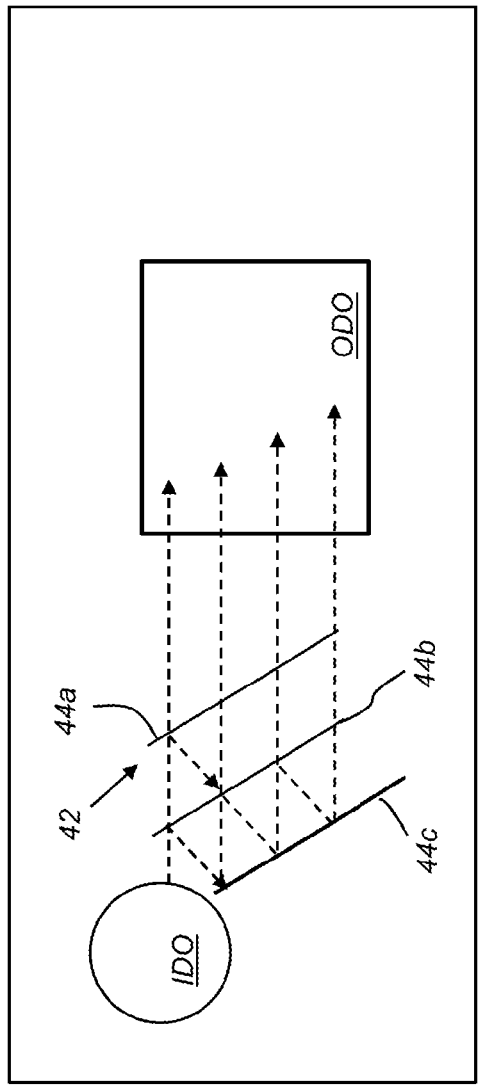
FIG. 10C is a schematic plan view showing an imaging light guide having a gradient reflector array according to another embodiment of the present disclosure.

As is best shown in FIGS. 10A through 10C, the light path through gradient mirror array 42 directs the light so that a first portion of each the image-bearing light beam is transmitted directly through the reflector array and the balance of the image-bearing light of each beam is reflected an even number of times (2 reflections, 4 reflections, 6 reflections, etc.) by the two or more at least partially reflective surfaces 44a, 44b, 44c of mirror array 42.

FIGS. 10A and 10B show gradient mirror array 42 disposed at different oblique angles relative to out-coupling diffraction optic ODO, based on the relative position of in-coupling diffraction optic IDO. FIG. 10C shows mirror array 42 having more than two reflective surfaces 44a, 44b, 44c for expanding the image-bearing light beam in the y-axis dimension. Out-coupling diffraction optic ODO then expands the image-bearing light with respect to the x-axis dimension.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide for conveying a virtual image, comprising:
a waveguide;
an in-coupling diffractive optic having a first grating vector, wherein the in-coupling diffractive optic is arranged to direct image-bearing light beams into the waveguide; and
a reflector array of two or more at least partially reflective surfaces oriented in parallel and arranged to expand the respective image-bearing light beams from the in-coupling diffractive optic in a first dimension and to direct the expanded image-bearing light beams toward an out-coupling diffractive optic, wherein the two or more at least partially reflective surfaces are specularly reflective, and
wherein the out-coupling diffractive optic has a second grating vector parallel to the first grating vector and is disposed to expand the respective image-bearing light beams in a second dimension orthogonal to the first dimension and to direct the image-bearing light beams from the waveguide toward an eyebox.

2. The imaging light guide of claim 1, wherein the two or more at least partially reflective surfaces of the reflector array comprise first and second surfaces, wherein the first surface is partially reflective and partially transmissive, and the second surface is fully reflective.

3. The imaging light guide of claim 2, wherein the first surface has a length and reflectivity values that vary along at least a portion of the length.

4. The imaging light guide of claim 3, wherein the reflectivity values of the first surface vary monotonically along the length from less than 10% reflectivity to greater than 50% reflectivity.

5. The imaging light guide of claim 2, wherein the two or more at least partially reflective surfaces of the reflector array further comprise a third surface, wherein the third surface is disposed between the first and second surfaces, the third surface is partially reflective and partially transmissive, and the third surface has a reflectivity value that is greater than a reflectivity value of the first surface.

6. The imaging light guide of claim 1, wherein at least one of the in-coupling and out-coupling diffractive optics is a diffraction grating.

7. The imaging light guide of claim 1, wherein a first portion of an image-bearing light beam is transmitted directly through the reflector array and a balance of the image-bearing light beam is reflected an even number of times by the two or more at least partially reflective surfaces.

8. The imaging light guide of claim 1, wherein at least one of the in-coupling and out-coupling diffractive optics is a volume hologram or formed from a holographic polymer dispersed liquid crystal.

9. The imaging light guide of claim 1, wherein one or more of the at least partially reflective surfaces is formed using dichroic coatings.

10. The imaging light guide of claim 1, wherein the out-coupling diffractive optic and the in-coupling diffractive optic have the same grating period.

11. The imaging light guide of claim 1, wherein the reflector array is relatively positioned to reflect central field rays of the image-bearing light beams between the in-coupling diffractive optic and the out-coupling diffractive optic through an oblique angle.

12. An imaging light guide for conveying a virtual image, comprising:
a) an in-coupling diffractive optic formed on a flat substrate, the in-coupling diffractive optic having a first grating vector, wherein the in-coupling diffractive optic is arranged to diffract incident image-bearing light beams into the substrate;
b) first and second at least partially reflective surfaces arranged in parallel along or within the substrate, and c) an out-coupling diffractive optic formed on the substrate, the out-coupling diffractive optic having a second grating vector parallel to the first grating vector, wherein the out-coupling diffraciive optic is arranged to direct the image-bearing light beams outward from the substrate, wherein the first at least partially reflective surface is partially reflective and partially transmissive, the second at least partially reflective surface is more fully reflective, wherein the first partially reflective and partially transmissive surface is arranged (a) to reflect portions of the image-bearing light beams reflected by the second more fully reflective surface back toward the second more fully reflective surface and (b) to transmit portions of the image-bearing light beams reflected by the second more fully reflective surface toward the out-coupling diffractive optic, and wherein the first and second at least partially reflective surfaces are specularly reflective.

13. The imaging light guide of claim 12, wherein the first partially reflective and partially transmissive surface has a length and reflectivity values that vary along at least a portion of the length.

14. The imaging light guide of claim 13, wherein the different reflectivity values of the first partially reflective and partially transmissive surface range over a gradient from less than 10% reflectivity to greater than 50% reflectivity.

15. The imaging light guide of claim 12, wherein the first and second at least partially reflective surfaces are relatively positioned to reflect central field rays of the image-bearing light beams between the in-coupling diffractive optic and the out-coupling diffractive optic through an oblique angle.

16. The imaging light guide of claim 12, wherein the out-coupling diffractive optic and the in-coupling diffractive optic have the same grating period.

17. The imaging light guide of claim 12, in which the first and second at least partially reflective surfaces are spaced apart through a limited distance at which portions of the image-bearing light beams at least proximately overlap en route to the out-coupling diffractive optic.

18. A method of making an imaging light guide, comprising:
a) forming an in-coupling diffractive optic on a planar substrate, wherein the in-coupling diffractive optic has a first grating period and a first grating vector;
b) forming an out-coupling diffractive optic on the planar substrate, wherein the out-coupling diffractive optic has a second grating period equal to the first grating period and a second grating vector that is parallel to the first grating vector; and
c) forming a reflector array along or within the planar substrate and disposed to direct diffracted light from the in-coupling diffractive optic to the out-coupling diffractive optic, wherein the reflector array is formed with two or more at least partially reflective surfaces oriented in parallel and wherein each of the two or more at least partially reflective surfaces is formed having a different reflectivity, wherein the two or more at least partially reflective surfaces are specularly reflective.

19. The method of claim 18, wherein the step of forming the in-coupling diffractive optic includes arranging the in-coupling diffractive optic to diffract an incident image-bearing light beams into the planar substrate to propagate within the substrate toward the reflector array, and the step of forming the out-coupling diffractive optic includes arranging the out-coupling diffractive optic to diffract incident image-bearing light beams reflected from the reflector array out of the planar substrate.

20. The method of claim 19, wherein the step of forming the reflector array includes arranging the reflector array to expand the image-bearing light beams from the in-coupling diffractive optic in a first dimension.

21. The method of claim 20, wherein the step of forming the out-coupling diffractive optic includes arranging the out-coupling diffractive optic to expand the image-bearing light beams from the reflector array in a second dimension orthogonal to the first dimension.

22. The method of claim 21, wherein the steps of forming the in-coupling diffractive optic, the out-coupling diffractive optic and the reflector array include relatively positioning the reflector array to reflect central field rays of the virtual image between the in-coupling diffractive optic and the out-coupling diffractive optic through an oblique angle.

* * * * *